(No Model.) 2 Sheets—Sheet 2.

J. M. SMITH.
GRAIN SEPARATOR.

No. 329,602. Patented Nov. 3, 1885.

Witnesses,
Geo. H. Strong.

Inventor,
Jas. Milton Smith
By
Dewey & Co.
Attorneys

United States Patent Office.

JAMES MILTON SMITH, OF ETNA, CALIFORNIA.

GRAIN-SEPARATOR.

SPECIFICATION forming part of Letters Patent No. 329,602, dated November 3, 1885.

Application filed February 28, 1885. Serial No. 157,384. (No model.)

*To all whom it may concern:*

Be it known that I, J. MILTON SMITH, of Etna, Siskiyou county, State of California, have invented an Improvement in Grain-Separators; and I hereby declare the following to be a full, clear, and exact description of the same.

My invention relates to a new and useful grain-separator and to certain improvements therein.

My invention consists in the combination of devices which I shall hereinafter fully explain, and point out in the claims.

The object of my invention is, generally, to provide a complete and thoroughly effective grain-separator.

Figure 1:
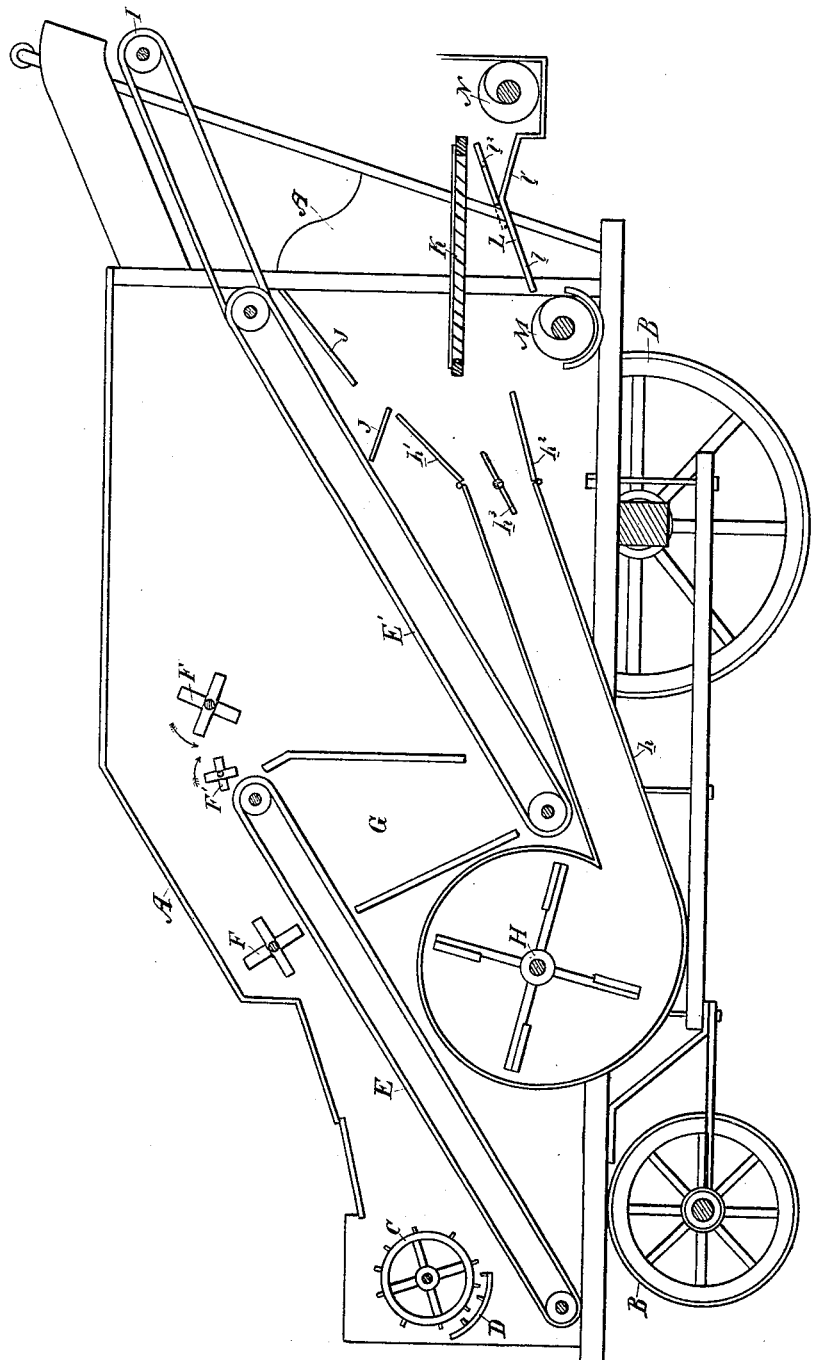
Figure 2:
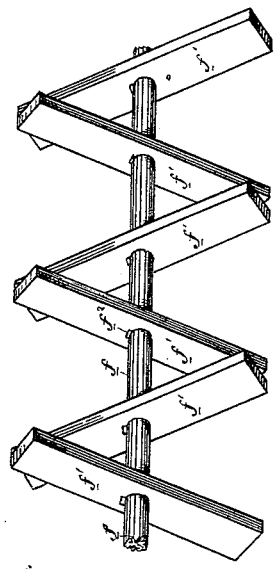
Figure 3:
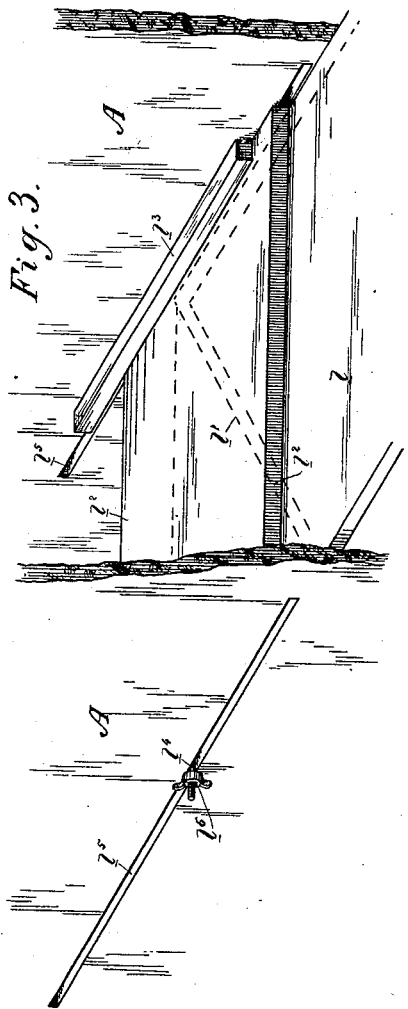

The particular object or advantage of the several improvements I shall describe in connection with each part.
Referring to the accompanying drawings, Figure 1 is a vertical longitudinal elevation of my separator. Fig. 2 is a similar view of the beater. Fig. 3 is a perspective view of the shoe-bottom.
A is the frame of the machine, and B are the wheels.

C is the cylinder, and D the concave.

E is a grain belt or carrier of the usual construction.
F is a beater over the grain-belt. F' is a similar one, though smaller, located at the end of the belt, and F² is a third one, larger than F', and situated beyond it. These beaters consist, as shown in Fig. 2, of shafts $f$, to which are imparted a rotary motion. The arms $f'$ consist of straight pieces seated by their centers upon the shaft at a short distance from each other and secured by suitable wedges, $f^2$. They do not all project in the same direction, but are mounted at various angles, though all are radial. Under the upper end of the grain-carrier E is a hopper, G, the back board of which is separated sufficiently from the end of the carrier to allow the grain already separated to fall into and through the hopper, though the straw misses it and drops down behind it. The two beaters F' F² rotate toward each other, as shown by the arrows, whereby the straw is forced down between them.

E' is a second grain carrier or belt, the lower end of which is five feet (more or less) below the upper end of the first grain-carrier, and is just under the hopper, whereby the grain is deposited upon it, and also the straw a little higher up. Forward of the hopper G and the lower end of the carrier E' is the fan-blower H, the wind passage or chute $h$ of which passes under the carrier and extends rearwardly. At its mouth, to its upper edge, is hinged an adjustable wind-board, $h'$, and a similar one, $h^2$, is hinged to its lower edge. Both of these wind-boards are adapted to be operated from the outside by means of suitable lugs or arms extending through the sides of the machine, and unnecessary herein to show. Right in the center of the mouth of the wind-chute is a wind-board, $h^3$, which is mounted on a shaft, the ends of which are pivoted in the sides of the frame, and said board may also be adjusted from the outside by turning its pivot-rod. Communicating with the upper ends of the second carrier, E', is a short straw-carrier, I.

J are grain-directing boards under the upper end of the carrier E', and adapted to direct the grain to the riddle. The riddle is located in the wind-blast, whose direction, by reason of the wind-boards, may be divided and varied to strike above and under the riddle.

The shoe-bottom L is shown in detail in Fig. 3. It consists of a main floor, $l$, inclining downwardly toward the front, a secondary floor, $l'$, inclining downwardly toward the rear and joining the main floor on a ridge-line, and an adjustable floor, $l^2$. This lies upon the main floor with the same inclination, and is adapted to be moved forward or back by reason of having its ends fitted in guiding cleats or grooves $l^3$, on the sides of the frame. It is operated from without by means of a lug, $l^4$, extending from its end through a slot, $l^5$, in the frame and set by a thumb-screw, $l^6$. This board can be moved forward to expose the whole of the secondary floor $l'$, or back to cover it partially or wholly, thereby practically extending the main floor.

The adjustable shoe bottom L is located under the riddle to receive its siftings.

M is a grain-conveyer into which the main floor $l$ is adapted to discharge.

N is a conveyer into which the secondary floor $l'$ discharges.

The general operation of the machine is obvious, and it will be sufficient to state the objects and advantages of the particular features which I desire to claim.

My object in using two grain-carriers is to obtain the dump or drop from the top of the first to the bottom of the second. By this the straw is completely upset. In the first grain-carrier most of the grain is separated from the straw, and it is discharged from the top through the hopper G, and is deposited upon the second grain-carrier. The advantage of this is that such of the grain as was separated in the first instance remains separated. This would not be the case so completely if the grain and straw were allowed to go over the first carrier together. The grain which still remains with the straw on the first carrier is now separated by reason of passing the straw down through the oppositely-rotating beaters $F'$ $F^2$, whereby the grain, being heavier, falls away and down into the cells of the second carrier, while the straw falls or is thrown over the whole length of the second carrier and free of the grain. The second carrier, therefore, becomes a sort of receptacle for the contents of the first, which is, however, delivered to it, not as a mass, but in separate portions, the grain first and the straw afterward. The grain is thence delivered to the directing-chutes, which deliver it to the blast, while the straw is carried to the small straw-carrier, and thence to the stacker.

I am aware that a thrasher has been used in which there are two grain-carriers; but they do not bear the same relation nor perform the same service as mine.

I am also aware that a series of successive straw-carriers have been used, but these are not grain-carriers.

The blast from the fan is directed upon the falling grain when it leaves the second carrier.

By the adjustment of the wind-boards $h'$ $h^2$ $h^3$ at the mouth of the wind-chute the blast can be made to meet the falling grain and chaff at such an angle as to keep the light matter entirely clear of the riddle, and thereby prevent any clogging, no matter how rapidly it may come.

A practical test has proved that in order to clean grain fast and well, and at the same time save it, the blast must be steady upward and backward, with a greater tendency upward. By using a horizontal blast, as is customary, the grain is carried off with the chaff; but by properly adjusting the wind-boards, as described, and dropping the grain a short distance—say about ten inches—before it strikes the riddle it can be cleaned and saved effectually at double the capacity of cylinder.

With ordinary machines, the clean grain and the dirt and trash are again mingled and discharged into the conveyer; but with my device I have so arranged it that the forward two-thirds or main floor $l$ will catch the clean grain from the forward two-thirds of the riddle, and deliver to the conveyer M, while the secondary floor $l'$ will catch the dirt and trash from the rear of the riddle and discharge into a separate conveyer, N; but as the line of demarkation between the clean grain and the dirt and trash is not absolutely fixed, I provide for this by means of the adjustable floor $l^2$, whereby if I find that clean grain is coming through the riddle from a point behind the vertical plane of the main floor, I can move the adjustable floor $l^2$ back to meet the line of demarkation and thus save it. In this way the trash can go to the tailings and be thrashed again, and the clean grain be delivered into the sack or garner and without waste.

Having thus described my invention, what I claim as new, and desire to secure by Letters Patent, is—

1. In a thrashing-machine, the combination of the two grain carriers or belts E E', having tight or closed surfaces for carrying all the grain and straw, and arranged the one below the other in different inclined planes, whereby a drop is obtained from the discharge end of one to the receiving end of the other, the oppositely-rotating beaters $F'$ $F^2$ at the discharge end of the upper carrier, and consisting of small shafts having long straight arms, as described, and the hopper G, into which the beaters discharge the material upon the lower carrier, substantially as herein described.

2. In a thrashing-machine, and in combination with a riddle through which the grain is sifted or falls, a shoe-bottom having an inclined floor, $l$, adapted to receive the clean grain from the forward portion of the riddle and discharge it into a conveyer, an oppositely inclined floor, $l'$, adapted to receive the dirt and trash from the rear portion of the riddle, and to discharge them into a separate conveyer, and a sliding floor, $l^2$, having the inclination of and lying above the floor $l$, and adapted to cover wholly or partially the floor $l'$, substantially as and for the purpose herein described.

In witness whereof I have hereunto set my hand.

JAMES MILTON SMITH.

Witnesses:
A. C. J. ISAACS,
JNO. PARKER.